US008360822B2

(12) United States Patent  
Dahlheimer

(10) Patent No.: US 8,360,822 B2  
(45) Date of Patent: Jan. 29, 2013

(54) DEVICE FOR MACHINING A DIE PLATE OF AN EXTRUDER

(75) Inventor: Stefan Dahlheimer, Kleinostheim (DE)

(73) Assignee: Automatik Plastics Machinery GmbH, Grossostheim (DE)

( * ) Notice: Subject to any disclaimer, the term of this patent is extended or adjusted under 35 U.S.C. 154(b) by 524 days.

(21) Appl. No.: 12/566,929

(22) Filed: Sep. 25, 2009

(65) Prior Publication Data

US 2010/0081363 A1  Apr. 1, 2010

(30) Foreign Application Priority Data

Sep. 26, 2008  (DE) .................... 10 2008 049 054

(51) Int. Cl.  
*B24B 7/00* (2006.01)

(52) U.S. Cl. ............................ 451/28; 451/63; 451/439

(58) Field of Classification Search .................. 451/439, 451/415, 438, 28, 63  
See application file for complete search history.

(56) References Cited

U.S. PATENT DOCUMENTS

| 1,840,254 A | * | 1/1932 | Richardson | .................. 451/548 |
| 3,397,493 A | * | 8/1968 | Highberg | ...................... 451/488 |
| 5,518,439 A | * | 5/1996 | Lambertus | ...................... 451/45 |

FOREIGN PATENT DOCUMENTS

DE  4422200 C2  4/1996

* cited by examiner

*Primary Examiner* — Robert Rose  
(74) *Attorney, Agent, or Firm* — Buskop Law Group, P.C.; Wendy Buskop

(57) ABSTRACT

Methods and devices for machining a die plate of an extruder for pelletization are provided. The device can include a grinding wheel with a grinding surface rotatably disposed on a drive mechanism of a cutter head associated with the extruder. The grinding surface can include a hard coating aligned with the die plate.

19 Claims, 2 Drawing Sheets

DEVICE FOR MACHINING A DIE PLATE OF AN EXTRUDER

CROSS REFERENCE TO RELATED APPLICATIONS

The present application claims priority to co-pending German Patent Application No. DE 10 2008 049 054.7 filed on Sep. 26, 2008; entitled "Device for Machining a Die Plate of an Extruder", the entirety of which is incorporated herein by reference.

FIELD

The present embodiments generally relate to a device for machining a die plate of an extruder for pelletization, more especially for the pelletization of plastics, such as polyethylene or polypropylene.

BACKGROUND

Generally, the pelletization of plastics is frequently carried out by extruders in which the molten plastic starting material is pressed through the die orifices of a die plate into a cooling medium, such as water, wherein the material issuing from the die orifices of the die plate is cut off there by the blades of a rotating cutter head, this leading to the creation of pellets. Corresponding devices which execute, for example, processes for underwater pelletization are known as underwater pelletizers, such as SPHERO made by Automatik Plastics Machinery GmbH.

In such devices for pelletization, the high forces with which the blades of the cutter head are brought into contact with the die plate gives rise to a relatively high degree of wear on the die plate in the region of the die orifices, this resulting particularly in concentric wear marks on the die plate in the form of grooves. Starting from a certain depth of the grooves, it is necessary for the surfaces of die plates to be reground in order to ensure the reliable cutting-off of the issuing plastic material and so that there is no clumping or agglomeration of plastic material at the die orifices of the die plate, which might lead to a blockage of the die orifices of the die plate. Usually, die plates are removed from the pelletizer for regrinding, which means a considerable loss of time. Furthermore, it may be necessary at all times to have ready several sets of die plates that have, if necessary, already been reground, in order to minimize the time required for maintenance, during which time the pelletizer cannot be in operation.

Accordingly, a need exists for a device that can efficiently machine a die plate of an extruder without removing the die plate from the extruder. In addition, a further need exists for a device that can efficiently and accurately machine or re-machine a die plate of an extruder.

The present embodiments meet these needs.

BRIEF DESCRIPTION OF THE DRAWINGS

The detailed description will be better understood in conjunction with the accompanying drawings as follows.

Figure 1:
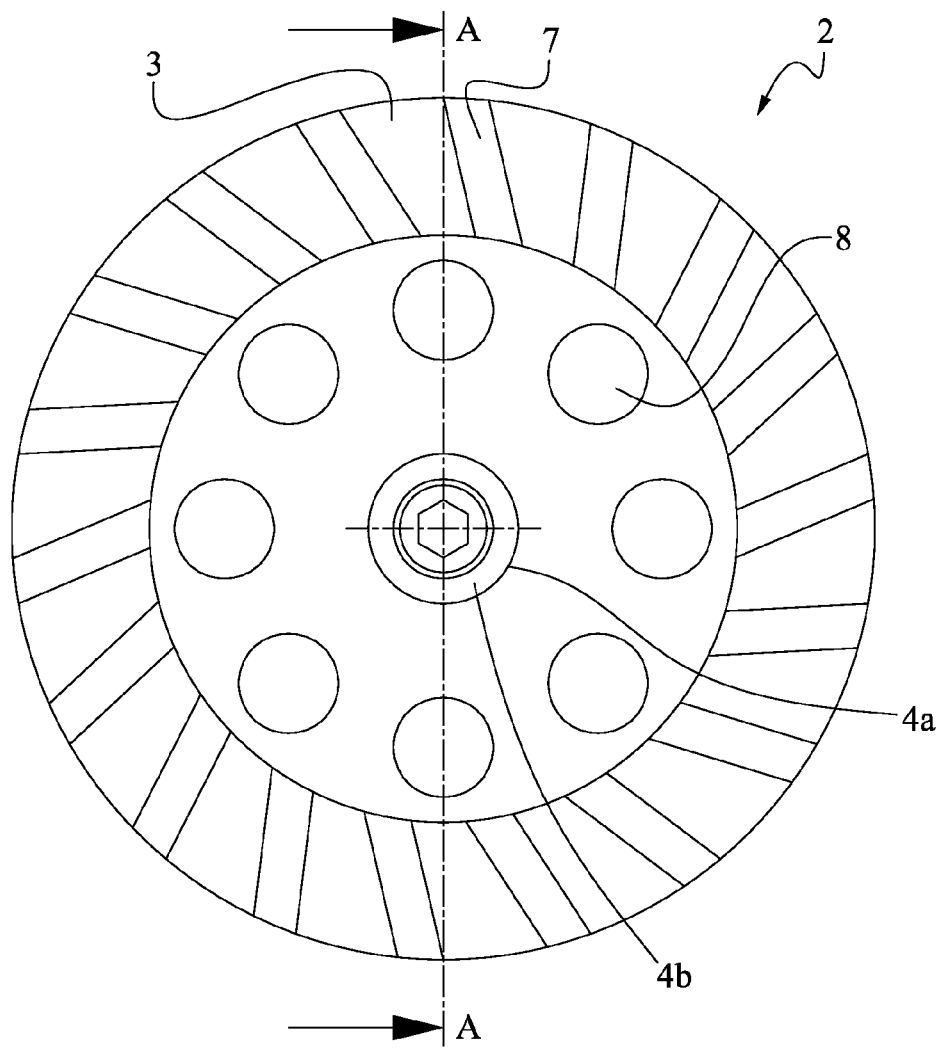
FIG. 1 depicts a schematic view of an illustrative grinding wheel according to one or more embodiments of the invention.

The present embodiments are detailed below with reference to the listed Figures.

DETAILED DESCRIPTION OF THE EMBODIMENTS

Before explaining the present apparatus in detail, it is to be understood that the apparatus is not limited to the particular embodiments and that it can be practiced or carried out in various ways.

The present embodiments relate to a device for machining or regrinding, a die plate of an extruder for pelletization. The device can include a grinding wheel with a grinding surface. The grinding wheel can be rotatably disposed on a cuter head associated with the extruder. For example, the grinding wheel can be disposed on the shaft by a revolving device connected with or on the drive shaft of a driving device of the cutter head.

In one or more embodiments, the grinding wheel can be disposed in axial alignment with the drive shaft and/or with one or more die plate/holes or circles of the die plate. The grinding wheel can be driven or rotated by the drive shaft. For example, one or more intermediary driving pins can transfer force from the drive shaft to the grinding wheel.

In one or more embodiments, at least a portion of the grinding wheel can be aligned with the die plate. For example, the grinding surface can be aligned with the die plate when the grinding wheel is attached to the drive shaft, and at least a portion of the grinding surface aligned with the die plate can have a hard coating.

The device can have a simple constructional design and can provide safe and reliable re-machining, machining of a die plate of an extruder when the die plate is in an installed state. The grinding wheel can have a one part design or an integrated grinding surface.

The hard coating of the grinding surface may be of coarse and/or fine grain depending on the specifically required degree of fineness. Illustrative hard coatings can include conventional diamond dust coatings.

In one or more embodiments, the entire grinding wheel can revolve about the axis of the driving device, which results during the re-machining or machining operation. As such, the grinding wheel and/or grinding surface can be optimized and in level contact with the die plate. Because of the revolving device, the grinding wheel of the device can be in suitably level alignment with the die plate in the appropriate machining plane.

In addition, the grinding wheel can be disposed on the drive shaft or drive device of the cutter head. I none or more embodiments, the drive grinding wheel can be disposed directly on the drive shaft. Accordingly, the grinding wheel can be disposed on the drive shaft or driving device without the interposition of any additional devices, such as eccentric devices, and the die plate can be machined or reground using the attached grinding wheel. In one or more embodiments, at least a portion of the grinding wheel can be disposed rotationally symmetrically with respect to an axis. The axis can be defined by the drive shaft.

In one or more embodiments, a revolving device can be disposed between the drive shaft and the grinding wheel, and connect the grinding wheel with the drive shaft. The revolving device can be a joint. In one or more embodiments, the joint can be a ball joint. The ball joint can have one or more driving pins. Furthermore, the ball joint can allow particularly simple automatic alignment when the grinding wheel is being brought into contact with the die plate.

In one or more embodiments, the ball joint can include a socket and a ball held in the socket. The socket can be disposed in a radially central region of the grinding wheel. Accordingly, the ball joint can be integrated as an integral component of the grinding wheel, which allows for especially simple axial alignment.

In one or more embodiments, all the connection dimensions of the grinding wheel can correspond to the corresponding dimensions of the cutting device, such as, the cutter head, used in normal production operations.

In one or more embodiments, the grinding surface can be disposed in the entire radially outer region of the grinding wheel. This uniform arrangement of the grinding surface over the entire corresponding circumferential region of the grinding wheel can result in a simple design and provide a design-inherent level or planar grinding surface for machining of the die plate.

In one or more embodiments, the grinding surface may be locally crossed by channels. The channels can extend radially outwards in the plane of the grinding surface. The channels can ensure that the material removed from the die plate can be carried away more easily. Accordingly, the channels and design of the grinding wheel can provide an efficient grinding operation at the die plate, and allow loose chips or material to be easily carried away in a radially outward direction.

In one or more embodiments, the grinding wheel can have one or more through-openings. The through-openings can be disposed in the radially inner middle region of the grinding wheel. The through-openings can be in fluid communication with the channels. As such, a fluid, such as water, can be used during the machining or re-machining operation, and the fluid can cool the machined region, because the fluid is able to be communicated to the machined region via the through-openings and channels. In addition, the fluid can carry removed material or chips away in a stream by the fluid in a radially outward direction away from the machined region.

In an embodiment, the grinding wheel can be of a one-piece design. For example, the grinding wheel can be a one-piece cup wheel. In one or more embodiments, when the grinding wheel is a cup wheel, the grinding wheel can have reinforced regions radially centrally and/or in the region below the grinding surface of the grinding wheel. Accordingly, the grinding wheel can have additional stiffening without any major complexity of design. The additional stiffening can improve the level contact of a plane of the grinding surface. The grinding wheel, for example when a cup wheel, can also increase dissipation of heat from the grinding region during the grinding operation.

In one or more embodiments, the device, as described herein, can be used with a method for grinding a die plate of an extruder for pelletization. The method can include moving the device up to the die plate. The grinding wheel can be pressed against the die plate. The grinding wheel can be revolved a revolving point. As the grinding wheel is revolved the grinding surface can remove chip or material from the die plate. In addition, the method can include providing fluid to at least a portion of the die plate; and removing at least a portion of material removed from the die plate with the fluid.

In one or more embodiments, the fluid can be provided to at least a portion of the die plate by passing the fluid through one or more of the through-openings in a direction parallel to an axis of the drive shaft and to one or more of the channels. The fluid can flow within the channel in a direction perpendicular to the axis of the drive shaft in a radially outward direction.

Turning now to the Figures, FIG. 1 depicts a schematic top plan view of an illustrative grinding wheel 2 according to one or more embodiments a device for machining a die plate of an extruder for pelletization. The grinding wheel 2 can have a grinding surface 3 which is disposed via a revolving device 4 on a drive shaft of a driving device of a cutter head facing the extruder.

The grinding surface 3 can have a hard coating 6, for example with a diamond coating. The hard coating 6 can be glued on or, if use is made of a suitable material, can also, for example, be applied by electroplating. The grinding surface 3 can be uniformly disposed over at least a portion of or the entire radially outer region of the grinding wheel 2.

The grinding surface 3 can be locally crossed by channels 7. The channels 7 can extend generally in a radially outward direction in the plane of the grinding surface 3. "Generally in a radially outward direction" can mean that, as can be seen from FIG. 1, the channels 7 are inclined slightly against the radius and extend from inside to outside as shown in FIG. 1. The grinding wheel 2 can have a plurality of through-openings 8 disposed in the radially inner middle region of the grinding wheel 2. The through-openings 8 can be in fluid communication with the channels 7. As such, if fluid, such as water, is used during re-machining/grinding or machining, the corresponding regions of the grinding wheel 2 and of the die plate, the latter is not shown in FIG. 1, can be cooled and, furthermore, the material removed from the die plate can be carried away in by the fluid. The fluid can flow through the through-openings 8 and then through the channels 7 preferably in a radially outward direction. A revolving device in the form of a ball joint with a socket 4a with a ball 4b therein. The socket 4a can be disposed in a radially central middle region of the grinding wheel 2. The revolving device is attached to a drive shaft of a driving device of a cutter head associated with the extruder, not shown in FIG. 1, for example, as can be seen from FIG. 1, by means of a screw which secures the ball 4b to the drive shaft.

Figure 2:
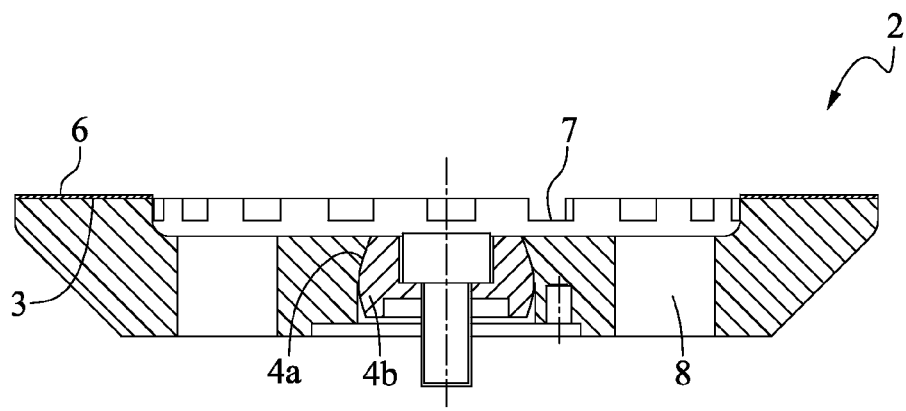
FIG. 2 depicts a schematic sectional view of the grinding wheel of FIG. 1, taken along section A-A in FIG. 1.

FIG. 2 depicts a schematic sectional view of the grinding wheel of FIG. 1, taken along section A-A in FIG. 1. The grinding wheel 2 can be of one-piece design in the form of a cup wheel. The grinding wheel 2 can have additional material behind the grinding surface 3 and in the central region of the grinding wheel 2.

The revolving device 4 can be disposed in the central region of the grinding wheel 2. The revolving device 4, which, in the form of a ball joint, can include the socket 4a and the ball 4b disposed within the socket 4a. The socket 4a can be disposed in the middle region of the grinding wheel 2. The ball 4b can be a ball segment held in the socket 4a, and can prevent the grinding wheel 2 from coming away from the drive shaft, not shown in FIG. 2, at the ball joint 4. For example, retaining collars can be disposed on upper and lower sides of the socket 4a and can hold the ball 4b securely within the socket 4a.

The channels 7 can locally cross the grinding surface 3 over a portion of or the entire radially outer region of the grinding wheel 2. The through-openings 8 can be in fluid communication with the channels 7. A continuous hard coating 6 can be disposed in the circumferential direction about at least the region of the grinding surface 3.

In addition, the grinding wheel 2 can be attached to the driving device of the cutter head, such as a drive shaft, by a screw. The screw is depicted in a cross sectional view.

Figure 3:
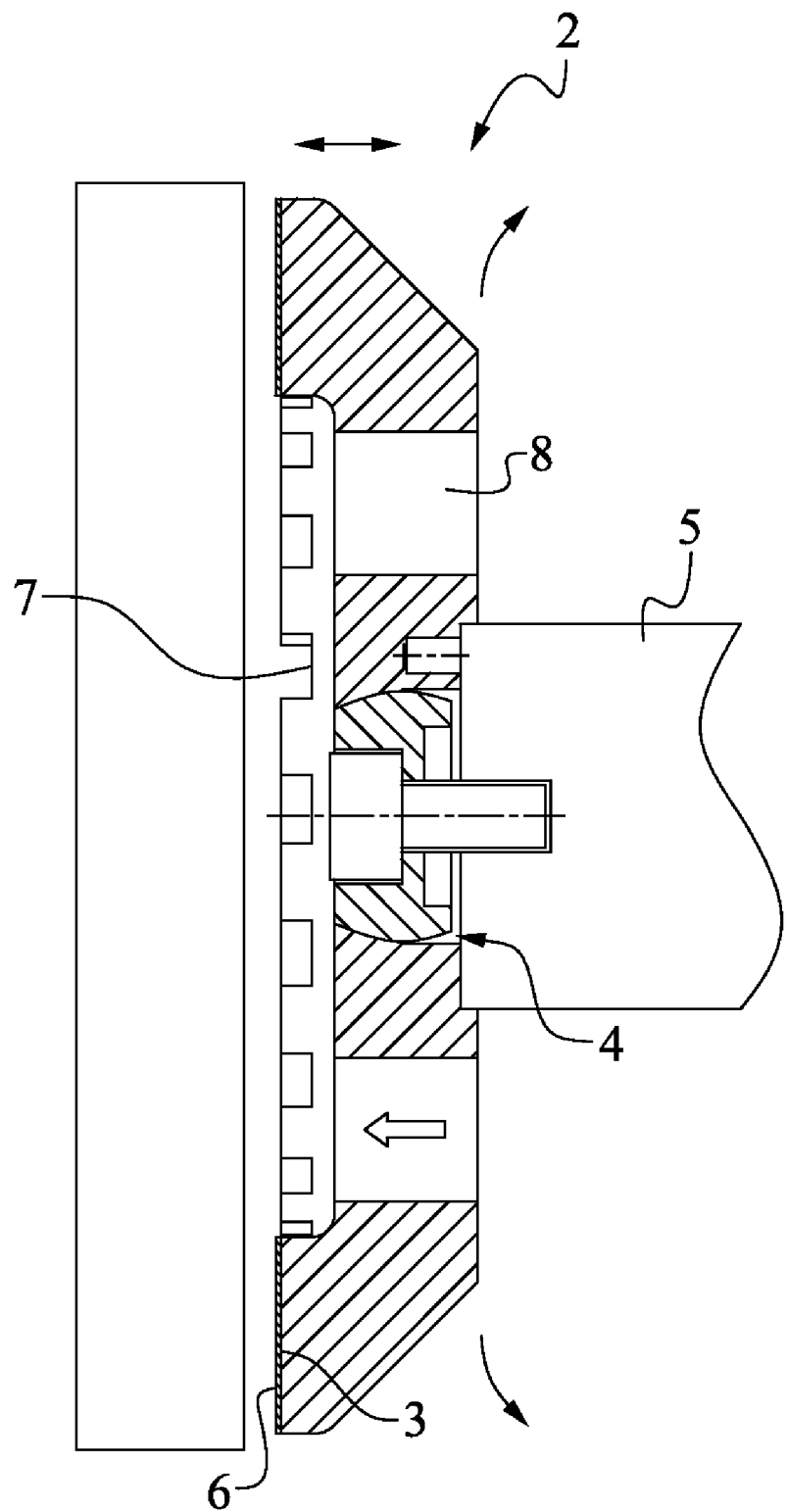
FIG. 3 depicts a schematic view of a device according to an embodiments of the invention.

FIG. 3 depicts a schematic view of a device according to an embodiment of the invention. The die plate 1 of an extruder for pelletization, which die plate is to be machined or reground, is indicated only schematically. The grinding wheel 2 with the corresponding grinding surface 3 is disposed via the revolving device 4 on the drive shaft 5 of the driving device of a cutter head associated with the extruder. The grinding wheel can be secured to the drive shaft 5 by a screw and is driven by driving pins in order to transfer the torque from the drive shaft 5 to the grinding wheel 2.

As is indicated by the corresponding arrows in FIG. 3, the device with the grinding wheel 2 can be moved up to and pressed against the to-be-machined die plate 1. For example, the drive shaft 5 can be used to move and press the grinding wheel against the to-be-machined die plate 1. As the grinding wheel is moved up and pressed against the to-be-machined die plate 1, an automatic alignment is effected by the revolving device 4.

The grinding wheel 2 can be revolved about a revolving point of the revolving device 4. For example, the grinding wheel 2 can be rotated about the rotating/revolving point of the presented ball joint, and the rotating/revolving point can be disposed proximate a central region of the grinding wheel 2.

As the grinding wheel 2 is rotated, the fluid can to pass through the through-openings 8 and the channels 7 to the to-be-machined region of the die plate 1, and the fluid can cool the machined region and carry removed material away outwardly from the machined region. The stream of fluid is illustrated by the corresponding arrow symbols in FIG. 3, and the fluid can pass through the through-openings 8 parallel to the axis of the drive shaft 5 and then perpendicularly to the drive shaft in a radially outward direction through the channels 7.

The device described herein is of simple design and provides automatic alignment and therefore an especially reliable means of machining the die plate 1 of an extruder for pelletization without the need for the die plate to be removed from the pelletizer While these embodiments have been described with emphasis on the embodiments, it should be understood that within the scope of the appended claims, the embodiments might be practiced other than as specifically described herein.

What is claimed is:

1. An assembly for machining a die plate of an extruder for pelletization comprising: a grinding wheel with a grinding surface, wherein the grinding wheel is attached to a drive shaft of a drive mechanism by a revolving device, wherein the revolving device is associated with the extruder, wherein the drive mechanism is configured to attach with and drive a cutter head when the grinding wheel is not attached to the drive mechanism, wherein the die plate is in an assembled state with the extruder and wherein the grinding surface comprises a hard coating aligned with the die plate.

2. The assembly of claim 1, wherein the revolving device is disposed between the grinding wheel and the drive mechanism, and wherein the revolving device is a joint.

3. The assembly of claim 2, wherein the joint is a ball joint.

4. The assembly of claim 3, wherein the ball joint further comprises a socket aligned with a radially central middle region of the grinding wheel, and wherein a ball is held in the socket.

5. The assembly of claim 1, wherein the grinding surface is disposed in an entire radially outer region of the grinding wheel and is locally crossed by channels.

6. The assembly of claim 5, wherein the channels extend in a radially outward direction in a plane of the grinding surface.

7. The assembly of claim 1, wherein the grinding surface comprises at least one through-opening.

8. The assembly of claim 7, wherein the at least one through-opening is disposed in a radially central middle region of the grinding wheel.

9. The assembly of claim 1, wherein the grinding wheel is a cup wheel comprising a one piece design.

10. The assembly of claim 1, wherein the grinding surface comprises a through-opening, and wherein the through-opening is in fluid communication with a channel locally crossed about the grinding wheel.

11. A method for grinding a die plate of an extruder for pelletization with a device associated therewith comprising:
   a. removing a cutting head from a drive mechanism associated with the extruder and attaching a grinding wheel with a grinding surface with a shaft of the drive mechanism using a revolving device, and wherein the grinding surface comprises a hard coating aligned with the die plate;
   b. pressing the grinding wheel against the die plate;
   c. revolving the grinding wheel about a revolving point removing material from the die plate;
   d. providing fluid to at least a portion of the die plate; and
   e. removing at least a portion of material removed from the die plate with the fluid.

12. The method of claim 11, wherein the device further comprises at least one through-opening, and wherein the through-opening is in fluid communication with a channel locally crossed about the grinding wheel.

13. The method of claim 12, wherein providing fluid to at least a portion of the die plate comprises passing the fluid through the at least one through-opening.

14. The method of claim 12, wherein providing fluid to at least a portion of the die plate comprises passing the fluid through the at least one through-opening in a direction parallel to an axis of the drive mechanism.

15. The method of claim 12, wherein providing fluid to at least a portion of the die plate further comprises passing fluid from the at least one through-opining through the channel in a direction perpendicular to the axis of the drive mechanism in a radially outward direction.

16. The method of claim 11, wherein the device further comprises a channel locally crossed about the grinding surface.

17. The method of claim 11, wherein the revolving device is a joint.

18. The method of claim 17, wherein the joint is a ball joint.

19. The method of claim 18, wherein the ball joint further comprises a socket aligned with a radially central middle region of the grinding wheel, and wherein a ball is held in the socket.

* * * * *